(12) United States Patent
Lee

(10) Patent No.: US 7,284,250 B2
(45) Date of Patent: Oct. 16, 2007

(54) ADJUSTMENT MECHANISM USED IN AN OPTICAL RECORDING AND/OR REPRODUCING APPARATUS

(75) Inventor: Cheng-Fu Lee, Hsinchu (TW)

(73) Assignee: Lite-On Corporation, Taipei (TW)

( * ) Notice: Subject to any disclaimer, the term of this patent is extended or adjusted under 35 U.S.C. 154(b) by 367 days.

(21) Appl. No.: 11/103,537

(22) Filed: Apr. 12, 2005

(65) Prior Publication Data
US 2005/0229191 A1    Oct. 13, 2005

(30) Foreign Application Priority Data
Apr. 13, 2004    (TW) .............................. 93110239 A

(51) Int. Cl.
*G11B 17/04* (2006.01)
(52) U.S. Cl. ..................................... 720/613
(58) Field of Classification Search ................ 720/613, 720/601, 606, 607, 603, 612
See application file for complete search history.

(56) References Cited

U.S. PATENT DOCUMENTS

2006/0288355 A1* 12/2006 Wu et al. .................... 720/613

* cited by examiner

*Primary Examiner*—Allen Cao
(74) *Attorney, Agent, or Firm*—Ming Chow; Sinorica, LLC

(57) ABSTRACT

An adjustment mechanism is used in an optical recording and/or reproducing apparatus for fixing the position of a tray. A slider moved along left-right direction in the optical recording and/or reproducing apparatus is corresponding the tray moved along front-back direction. The adjustment mechanism comprises a L-shaped chute located on the tray, and comprises a guide member and an arm located on the slider. When the tray get into the optical recording and/or reproducing apparatus, the guide member slides into the L-shaped chute. Then the arm contacts the outside surface of the L-shaped chute. Whereby, the tray be fixed on a suitable position.

10 Claims, 4 Drawing Sheets

ADJUSTMENT MECHANISM USED IN AN OPTICAL RECORDING AND/OR REPRODUCING APPARATUS

BACKGROUND OF THE INVENTION (1) Field of the Invention

The invention relates to an optical recording and/or reproducing apparatus, and more particularly to an adjustment mechanism used in an optical recording and/or reproducing apparatus.

(2) Description of the Prior Art

FIG. 1 shows a schematic view depicting a traditional optical recording and/or reproducing apparatus. Generally, the optical recording and/or reproducing apparatus, such as a optical disc drive, uses a tray 4 to load an optical storage medium, such as a compact disc, not shown, in and out of the optical recording and/or reproducing apparatus 2.

The tray 4 moves, along the front-back direction D1 in and out of the optical recording and/or reproducing apparatus 2. There is a slider 6 extending along the left-right direction D2 in the optical recording and/or reproducing apparatus 2. There is a rack 8 formed on the lateral edge of the slider 6. The rack 8 extends along the left-right direction D2 and is engaged with a gear 10 in the optical recording and/or reproducing apparatus 2. The gear 10 is rotated by the tray 4 moving in and out of the optical recording and/or reproducing apparatus 2. In this way, the slider 6 moves along the left-right direction D2 in the optical recording and/or reproducing apparatus 2 in response to the moving of the tray 4 along the front-back direction D1.

Traditionally, there is a L-shaped chute 12 provided on the tray 4 and a guide member 6a provided on the slider 6, respectively, used to position the tray 4 after the tray enters into the optical recording and/or reproducing apparatus 2.

The L-shaped chute 12 is located on the bottom of the tray 4 adjacent to one lateral of the slider 6. The L-shaped chute 12 includes a front chute 12a and a rear chute 12b. The front chute 12a is parallel to the front-back direction D1 and has two opened ends toward front and back, respectively. The rear chute 12b is connected to the backward opened end of the front chute 12a and thus forms a L-shaped configuration. The rear chute 12b is parallel to the left-right direction D2.

The guide member 6a is arranged on the slider 6 adjacent to the surface of the tray 4. When the tray 4 enters into the optical recording and/or reproducing apparatus 2, the guide member 6a is guided into the front chute 12a from the opened end of the L-shaped chute 12. Then, the guide member 6a is guided into the rear chute 12b by the slider 6 moving along the left-right direction D2.

In this way, after the tray 4 completely enters into the optical recording and/or reproducing apparatus 2, the guide member 6a sliding into the rear chute 12b positions the tray 4. Further, the baffle plate 16 of the tray 4 near the medium entry 20 contacts the edge of the medium entry 20 of the housing 18 so as to close the medium entry 20.

However, if the width of the L-shaped chute 12 is too narrow, the guide member 6a will get stuck due to interference of the L-shaped chute 12. On the other hand, if the width of the L-shaped chute 12 is too wide, even after the guide member 6a moving in the rear chute 12b, the L-shaped chute 12 sways easily. This leads to poor positioning of the tray 4. Further, from outside of the optical recording and/or reproducing apparatus 2, it is visible that baffle plate 16 cannot closely seal the seam between the medium entry 20 and the housing 18 of the optical recording and/or reproducing apparatus 2.

On the other hand, even though the L-shaped chute 12, having the width designed with the most accurate tolerance, does not interfere with the move of the guide member 6a, the tray 4 is still likely not to be positioned in the predetermined proper location due to the slider 6 improperly located. For example, if the slider 6 is too close to the medium entry 20, there will be a seam formed between the medium entry 20 and the baffle plate 16. If the slider 6 is far way from the medium entry 20, it is difficult to guide the guide member 6a into the rear chute 10b of the L-shaped chute 12.

Therefore, there is a need to provide an adjustment mechanism used in an optical recording and/or reproducing apparatus to solve the above problem.

SUMMARY OF THE INVENTION

It is one object of the present invention to provide an adjustment mechanism used in an optical recording and/or reproducing apparatus to adjust the tray to a proper location in the optical recording and/or reproducing apparatus. The baffle plate closely contacts the edge of the medium entry on the housing of the optical recording and/or reproducing apparatus so as to close the medium entry.

The present invention relates to an adjustment mechanism used in an optical recording and/or reproducing apparatus. The adjustment mechanism is used to adjust a tray of the optical recording and/or reproducing apparatus to a proper location in the optical recording and/or reproducing apparatus. The tray moves, along the front-back direction, in and out of the optical recording and/or reproducing apparatus. A slider, in the optical recording and/or reproducing apparatus, extends along the left-right direction in response to the moving of the tray.

The adjustment mechanism includes a L-shaped chute, a guide member and an arm.

The L-shaped chute is located in the bottom of the tray adjacent to one later of the slider. The L-shaped chute includes a front chute, parallel to the front-back direction. The L-shaped chute includes a rear chute, connected to the front chute and thus forms a L-shaped configuration, parallel to the left-right direction of the optical recording and/or reproducing apparatus.

The guide member is arranged on a surface of the slider adjacent to the tray. When the tray enters into the optical recording and/or reproducing apparatus, the guide member is guided into the front chute from the opened end of the L-shaped chute and then the guide member is guided into the rear chute by the slider moving along the left-right direction.

The arm is arranged on the surface of the slider. After the guide member is guided into the rear chute, a flexible end of the arm elastically leans against an outer surface, far away from the opened end of the L-shaped chute, of the rear chute.

Further description is given as follows. The adjustment mechanism further includes an outer side wall and an inner side wall, which form the front chute and the rear chute, and a chamfer, on the outer side wall, connecting the front chute and the rear chute, and a gap, formed between the guide member and the arm. When the tray is entering into the optical recording and/or reproducing apparatus, the outer side wall near the front chute slides into the gap so as to guide the guide member into the front chute from the opened end of the L-shaped chute. Then, after the chamfer gets into the gap, the outer side wall near the rear chute gets into the gap, the guide member is guided into the rear chute, and the arm elastically leans against the outer side wall near the rear chute when the guide member elastically leans against only the outer side wall or the inner side wall, the guide member does not contact the other side wall.

The tray further includes a baffle plate provided near the edge thereof. After the tray enters into the optical recording and/or reproducing apparatus, the baffle plate closely contacts the edge of a medium entry on a housing of the optical recording and/or reproducing apparatus so as to close the medium entry. The arm elastically leans against an outer surface, far away from the opened ends of the front chute, of the rear chute of the L-shaped chute, thereby making the baffle plate closely contact the edge of the medium entry on the housing of the optical recording and/or reproducing apparatus.

In the present optical recording and/or reproducing apparatus, the adjustment mechanism makes use of the arm having a flexible end to elastically lean against the L-shaped chute so as to position the tray to a proper location. Meanwhile, the baffle plate of the tray closely contacts the edge of the medium entry on the housing and thus closes the medium entry.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
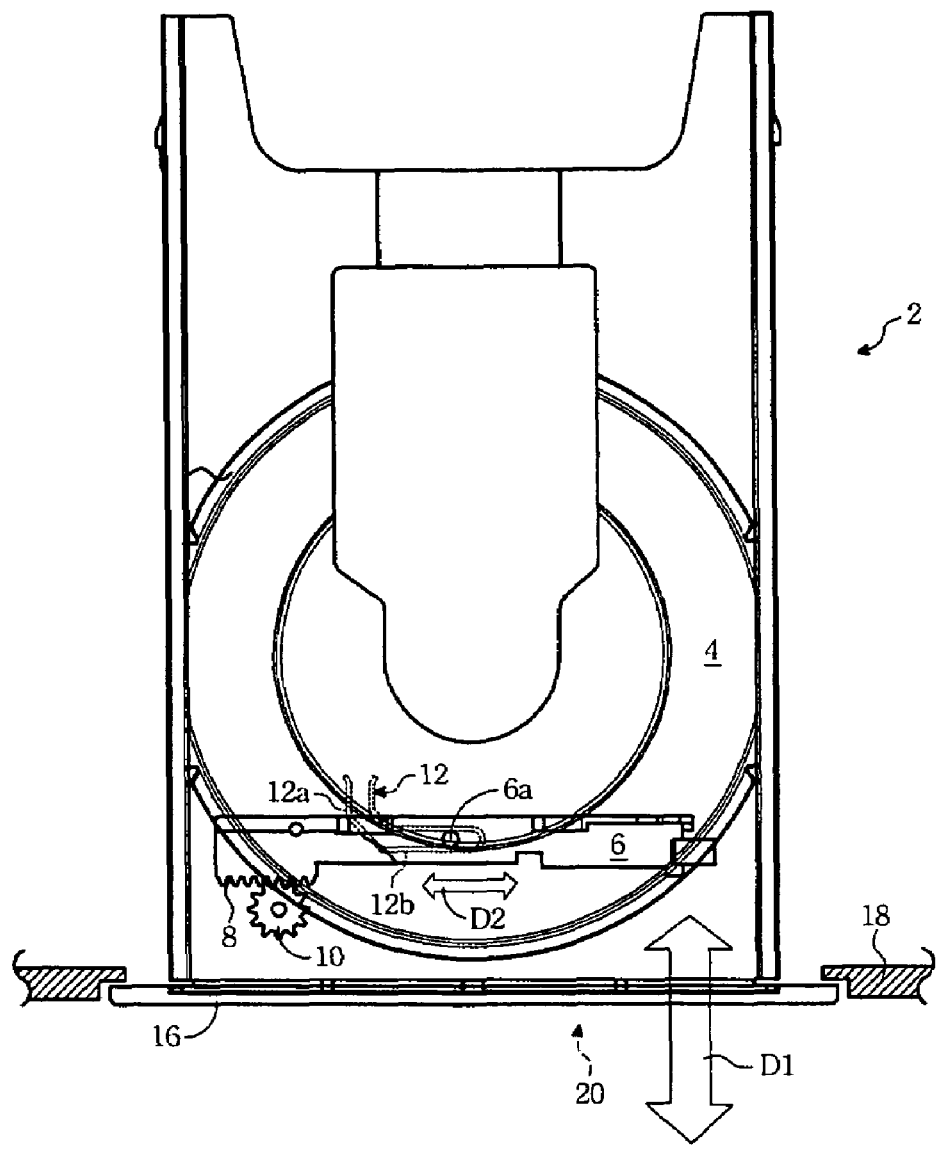
FIG. 1 shows a schematic view depicting a traditional optical recording and/or reproducing apparatus.
Figure 2:
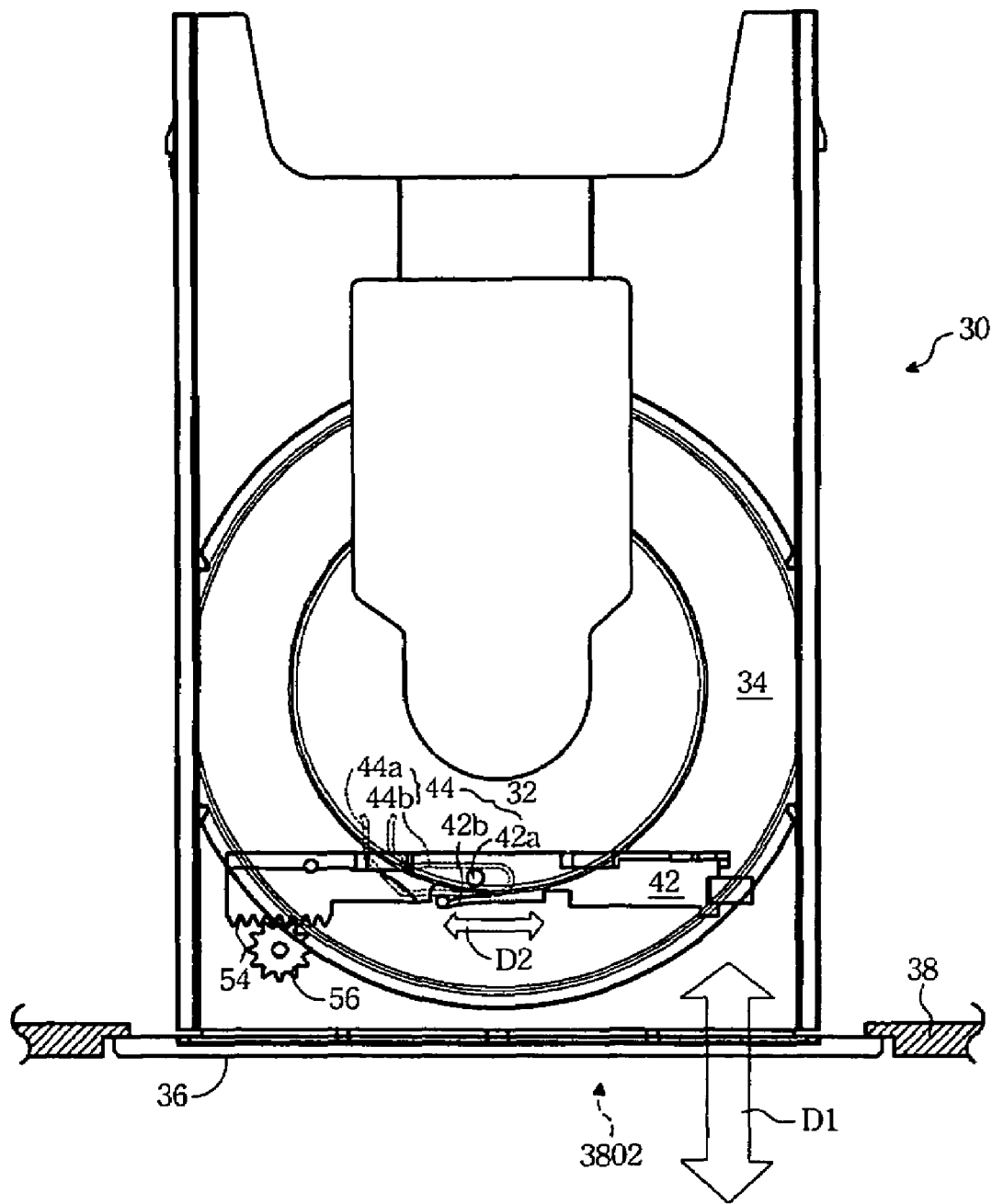
FIG. 2 shows a schematic view depicting the present optical recording and/or reproducing apparatus.

FIG. 2 shows a schematic view depicting the adjustment mechanism of the present optical recording and/or reproducing apparatus 30. The present invention relates to an adjustment mechanism 32 used in an optical recording and/or reproducing apparatus. Further, the adjustment mechanism is used to adjust the tray 34 to a proper location in the optical recording and/or reproducing apparatus. The tray 34 includes a baffle plate 36 provided near the outer edge thereof. After the tray 34 enters into the optical recording and/or reproducing apparatus 30, the baffle plate 36 will closely contact the edge of the medium entry 3802 on the housing 38 so as to close the medium entry 3802.

The tray 34 moves, along the front-back direction D1, in and out of the optical recording and/or reproducing apparatus 30. There is a slider 42 extending along the left-right direction D2 in the optical recording and/or reproducing apparatus 30. There is a rack 54 formed on the surface of the slider 42. The slider 42 moves along the left-right direction D2 in the optical recording and/or reproducing apparatus 30 in response to the moving of the tray 34 along the front-back direction D1.

The adjustment mechanism 32 includes a L-shaped chute 44, a guide member 42a and an arm 42b.

Figure 3:
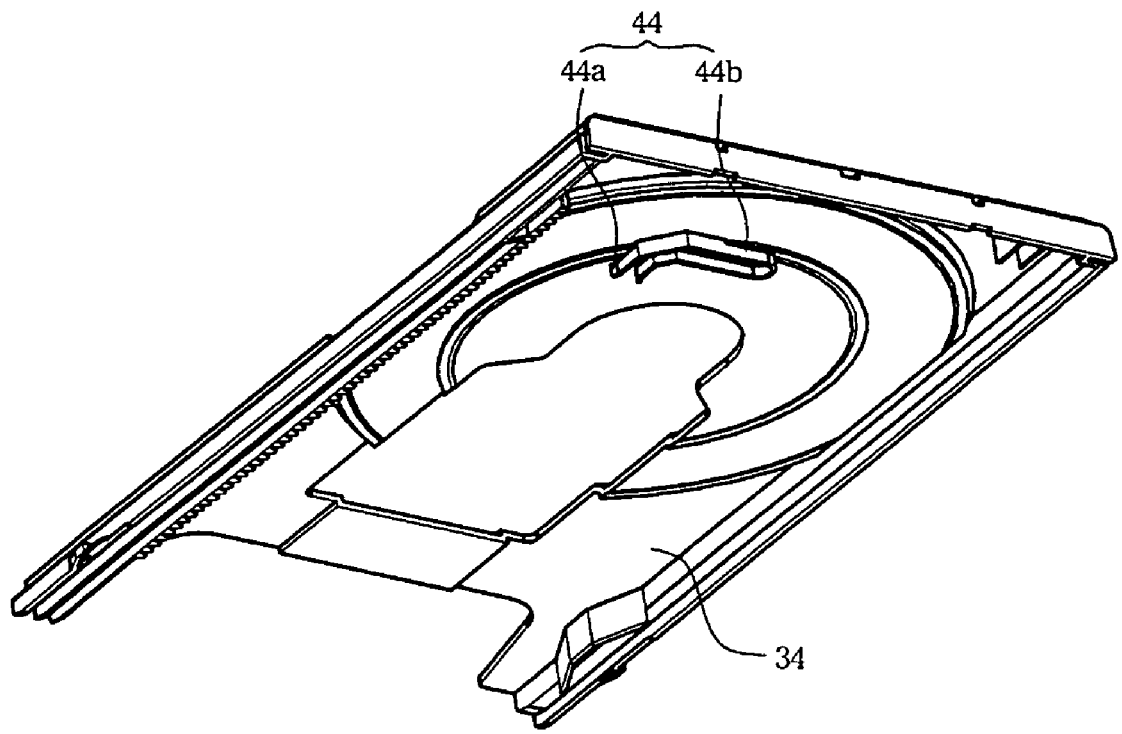
FIG. 3 shows a schematic view depicting the L-shaped chute of the present invention.

Please refer to FIG. 2 and FIG. 3 which shows a schematic view depicting the L-shaped chute 44 of the present invention. The L-shaped chute 44 is located in the bottom of the tray 34 adjacent to a lateral of the slider 42. The L-shaped chute 44 includes a front chute 44a and a rear chute 44b. The front chute 44a is parallel to the front-back direction D1 and has two opened ends toward front and back, respectively. The rear chute 44b is connected to the backward opened end of the front chute 44a and thus forms a L-shaped configuration. The rear chute 44b is parallel to the left-right direction D2 of the optical recording and/or reproducing apparatus 30.

Figure 4:
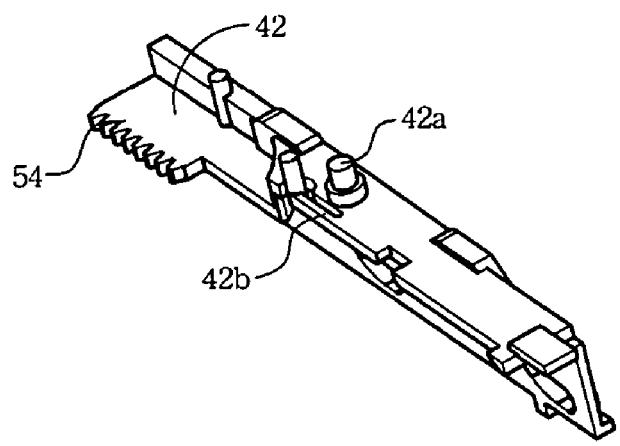
FIG. 4 shows a schematic view depicting the guide member and the arm of the present invention.

Please refer to FIG. 2 and FIG. 4 which shows a schematic view depicting the guide member 42a and the arm 42b of the present invention. The slider 42 includes the guide member 42a, the arm 42b and a rack 54.

The rack 54 is formed on the lateral edge of the slider 42. The rack 54 extends along the left-right direction D2 and is engaged with a gear 56 in the optical recording and/or reproducing apparatus 30. The gear 56 is rotated by the tray 34 moving in and out of the optical recording and/or reproducing apparatus 30. In this way, the slider 42 moves along the left-right direction D2 in the optical recording and/or reproducing apparatus 30 in response to the moving of the tray 34 along the front-back direction D1.

The guide member 42a is arranged on the surface of the slider 42 adjacent to the tray 34. When the tray 34 enters into the optical recording and/or reproducing apparatus 30, the guide member 42a is guided into the front chute 44a from the opened end of the L-shaped chute 44. Then, the guide member 42a is guided into the rear chute 44b by the slider 42 moving along the left-right direction D2.

The arm 42b is formed on a lateral of the slider 42 same with the location of the rack 54. After the guide member 42a is guided into the rear chute 44b, the flexible end of the arm 42b elastically leans against an outer surface, far away from the opened end of the L-shaped chute 44, of the rear chute 44b. The arm 42b leaning against the outer surface, far away from the opened ends of the front chute 44a, of the rear chute 44b of the L-shaped chute 44 applies force pushing the tray 34 toward the inner of the optical recording and/or reproducing apparatus 30 so as to make the baffle plate 36 closely contact the edge of the medium entry 3802 on the housing 38 of the optical recording and/or reproducing apparatus 30.

Figure 5A:
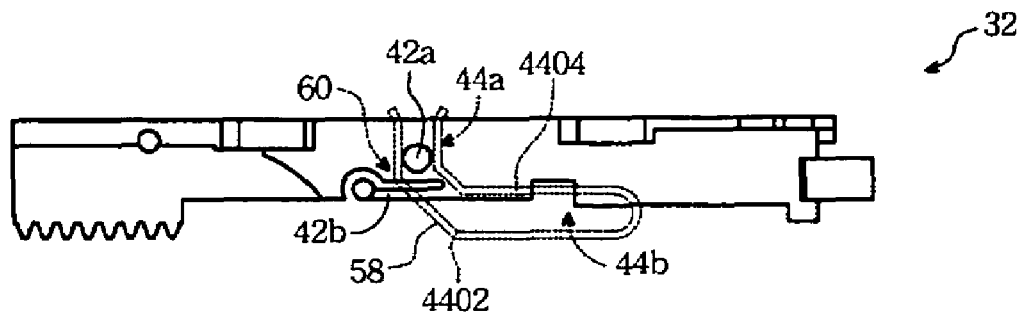
FIG. 5A shows a schematic view depicting the present adjustment mechanism in a first status.
Figure 5B:
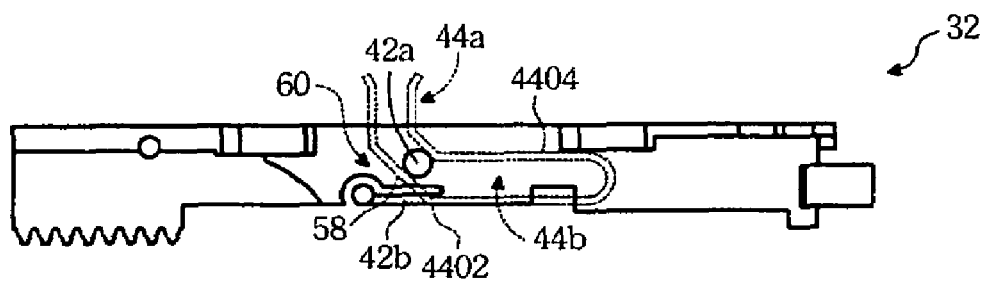
FIG. 5B shows a schematic view depicting the present adjustment mechanism in a second-status.
Figure 5C:
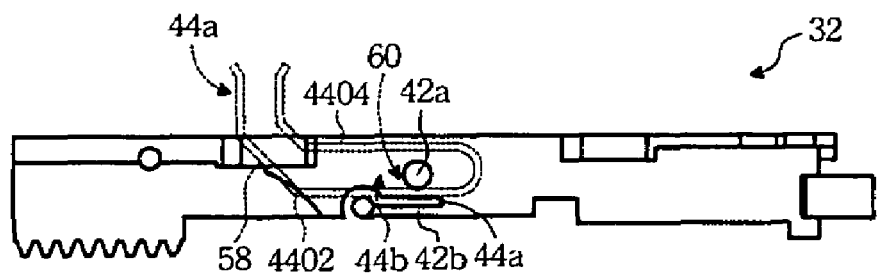
FIG. 5C shows a schematic view depicting the present adjustment mechanism in a third status.

For further description, please refer to FIG. 5A, FIG. 5B and FIG. 5C. FIG. 5A shows a schematic view depicting the adjustment mechanism 32 in a first status. FIG. 5B shows a schematic view depicting the adjustment mechanism 32 in a second status. FIG. 5C shows a schematic view depicting the adjustment mechanism 32 in a third status.

Referring to FIG. 5A, the adjustment mechanism 32 includes an outer side wall 4402 and an inner side wall 4404, which form the front chute 44a and the rear chute 44b. On the outer side wall 4402, there is a chamfer 58 connecting the front chute 44a and the rear chute 44b. Further, there is a gap 60 formed between the guide member 42a and the arm 42b. As shown in FIG. 5A, when the tray 34 is entering into the optical recording and/or reproducing apparatus 30, the outer side wall 4402 near the front chute 44a slides into the gap 60 so as to guide the guide member 42a into the front chute 44a from the opened end of the L-shaped chute 44. Then, as shown in FIG. 5B, the chamfer 58 gets into the gap 60. As shown in FIG. 5C, after the outer side wall 4402 near the rear chute 44b gets into the gap 60 and the guide member 42a is guided into the rear chute 44b, the arm 42b elastically leans against the outer side wall 4402 near the rear chute 44b.

For the above-mentioned adjustment mechanism 32, when the guide member 42a elastically leans against only the outer side wall 4402 or the inner side wall 4404, the guide member 42a does not contact the other side wall. That is, the L-shaped chute 44 of the present invention can be designed with wider width compared with the prior art. In the slider 42 of the present invention, because the arm 42b applies force pushing the tray toward the inner of the optical recording and/or reproducing apparatus 30, the problem of poor positioning encountered by the prior art will not occur. Meanwhile, the wider L-shaped chute 44 prevents the guide member 42a from getting stuck due to interference.

In the present optical recording and/or reproducing apparatus 30, the adjustment mechanism 32 makes use of the arm 42b having a flexible end to elastically lean against the L-shaped chute 44 so as to position the tray 34 to a proper location. Meanwhile, the baffle plate 36 of the tray 34 closely contacts the edge of the medium entry 3802 on the housing 38 and thus closes the medium entry 3802.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

I claim:

1. An adjustment mechanism used in an optical recording and/or reproducing apparatus, the adjustment mechanism being used to adjust a tray of the optical recording and/or reproducing apparatus to a proper location in the optical recording and/or reproducing apparatus, the tray moving, along the front-back direction, in and out of the optical recording and/or reproducing apparatus, the optical recording and/or reproducing apparatus including a slider extending along the left-right direction in response to the moving of the tray, the adjustment mechanism comprising:
    a L-shaped chute, located in the bottom of the tray adjacent to one lateral of the slider, including
        a front chute, parallel to the front-back direction; and
        a rear chute, connected to the front chute and thus forms a L-shaped configuration, parallel to the left-right direction of the optical recording and/or reproducing apparatus;
    a guide member, arranged on a surface of the slider adjacent to the tray, wherein when the tray enters into the optical recording and/or reproducing apparatus, the guide member is guided into the front chute from the opened end of the L-shaped chute and then the guide member is guided into the rear chute by the slider moving along the left-right direction; and
    an arm, arranged on the surface of the slider, wherein after the guide member is guided into the rear chute, a flexible end of the arm elastically leans against an outer surface, far away from the opened end of the L-shaped chute, of the rear chute.

2. The adjustment mechanism according to claim 1, wherein the adjustment mechanism further comprises:
    an outer side wall and an inner side wall, which form the front chute and the rear chute;
    a chamfer, on the outer side wall, connecting the front chute and the rear chute; and
    a gap, formed between the guide member and the arm, wherein when the tray is entering into the optical recording and/or reproducing apparatus, the outer side wall near the front chute slides into the gap so as to guide the guide member into the front chute from the opened end of the L-shaped chute, then, after the chamfer gets into the gap, the outer side wall near the rear chute gets into the gap, and the guide member is guided into the rear chute, and the arm elastically leans against the outer side wall near the rear chute.

3. The adjustment mechanism according to claim 2, wherein the guide member only elastically leans against one of the outer side wall and the inner side wall.

4. The adjustment mechanism according to claim 1, wherein the slider further comprises a rack, formed on a side thereon, extending along the left-right direction and engaged with a gear rotate by the tray moving in and out of the optical recording and/or reproducing apparatus, thereby, the slider moving along the left-right direction in the optical recording and/or reproducing apparatus in response to the moving of the tray along the front-back direction.

5. The adjustment mechanism according to claim 1, wherein the tray further comprises a baffle plate provided near the outer edge thereof, after the tray enters into the optical recording and/or reproducing apparatus, the baffle plate closely contacts the edge of a medium entry on a housing of the optical recording and/or reproducing apparatus so as to close the medium entry;
    wherein the arm elastically leans against an outer surface, far away from the opened ends of the front chute, of the rear chute of the L-shaped chute, thereby making the baffle plate closely contact the edge of the medium entry on the housing of the optical recording and/or reproducing apparatus.

6. An optical recording and/or reproducing apparatus, having a tray moving, along the front-back direction, in and out of the optical recording and/or reproducing apparatus, and a slider extending along the left-right direction in response to the moving of the tray, the optical recording and/or reproducing apparatus comprising:
    a L-shaped chute, located in the bottom of the tray adjacent to one lateral of the slider, including
        a front chute, parallel to the front-back direction; and
        a rear chute, connected to the front chute and thus forms a L-shaped configuration, parallel to the left-right direction of the optical recording and/or reproducing apparatus;
    a guide member, arranged on a surface of the slider adjacent to the tray, wherein when the tray enters into the optical recording and/or reproducing apparatus, the guide member is guided into the front chute from the opened end of the L-shaped chute and then the guide member is guided into the rear chute by the slider moving along the left-right direction; and
    an arm, arranged on the surface of the slider, wherein after the guide member is guided into the rear chute, a flexible end of the arm elastically leans against an outer surface, far away from the opened end of the L-shaped chute, of the rear chute.

7. The apparatus according to claim 6, further comprises:
    an outer side wall and an inner side wall, which form the front chute and the rear chute;
    a chamfer, on the outer side wall, connecting the front chute and the rear chute; and
    a gap, formed between the guide member and the arm, when the tray is entering into the optical recording and/or reproducing apparatus, the outer side wall near the front chute slides into the gap so as to guide the guide member into the front chute from the opened end of the L-shaped chute, then, after the chamfer gets into the gap, the outer side wall near the rear chute gets into the gap, and the guide member is guided into the rear chute, and the arm elastically leans against the outer side wall near the rear chute.

8. The apparatus according to claim 7, wherein the guide member only elastically leans against one of the outer side wall and the inner side wall.

9. The apparatus according to claim 6, wherein the slider further comprises a rack, formed on a side thereon, extending along the left-right direction and engaged with a gear rotate by the tray moving in and out of the optical recording and/or reproducing apparatus, thereby, the slider moving along the left-right direction in the optical recording and/or reproducing apparatus in response to the moving of the tray along the front-back direction.

10. The apparatus according to claim 6, wherein the tray further comprises a baffle plate provided near the outer edge thereof, after the tray enters into the optical recording and/or reproducing apparatus, the baffle plate closely contacts the edge of a medium entry on a housing of the optical recording and/or reproducing apparatus so as to close the medium entry;

wherein the arm elastically leans against an outer surface, far away from the opened ends of the front chute, of the rear chute of the L-shaped chute, thereby making the baffle plate closely contact the edge of the medium entry on the housing of the optical recording and/or reproducing apparatus.

* * * * *